Aug. 6, 1963 O. J. McCABE 3,100,266
TRANSISTOR DISCRIMINATING CIRCUIT WITH DIODE BYPASS MEANS FOR THE EMITTER-BASE CIRCUIT OF EACH TRANSISTOR
Filed Feb. 11, 1957
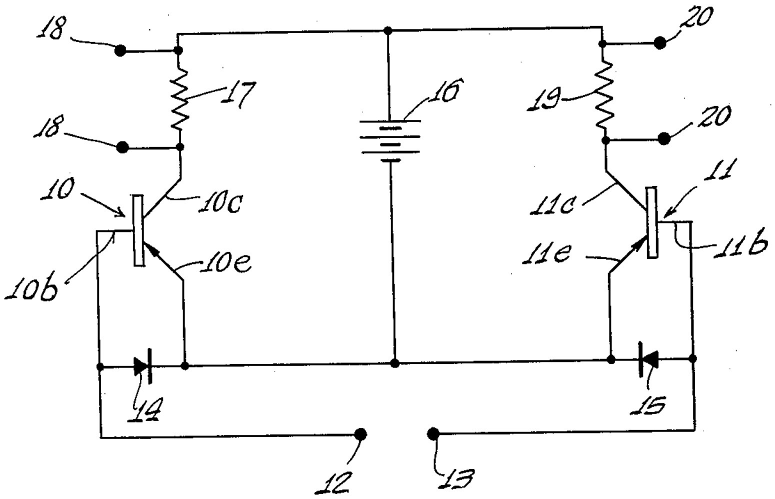
INVENTOR.
Owen J. McCabe
BY
Johnson and Kline
ATTORNEYS United States Patent Office 3,100,266
Patented Aug. 6, 1963

3,100,266

TRANSISTOR DISCRIMINATING CIRCUIT WITH DIODE BYPASS MEANS FOR THE EMITTER-BASE CIRCUIT OF EACH TRANSISTOR

Owen J. McCabe, Bristol, Conn., assignor to The Superior Electric Co., Bristol, Conn., a corporation of Connecticut Filed Feb. 11, 1957, Ser. No. 639,317
5 Claims. (Cl. 307—88.5)

The present invention relates to an electrical circuit and, more particularly, to a discriminating circuit in which a reversible polarity input signal is distinguished so that one polarity of the signal appears at one set of output terminals and a signal of the reverse polarity appears at another set of output terminals.

A discriminating circuit of the above type is generally employed in combination with a sensing component which has an output signal when the value of an electrical unit deviates from a preselected value. A simple form of such a sensing component is a Wheatstone bridge. The bridge has its input connected to an electrical device having the electrical unit to be measured and the bridge produces an output signal which has one polarity when the electrical unit deviates from its preselected value in one direction and a signal of the reverse polarity when the deviation is in the opposite direction. When the electrical unit is equal to the preselected value, there is no output signal as the bridge is balanced. In addition, in the simple form of the bridge, the amount of the deviation is indicated by the magnitude of the bridge output signal. The discriminating circuit functions to distinguish between each polarity and produces two independent output signals, one for each polarity of its input signal. While reference has been made to a Wheatstone bridge, the invention is not limited solely to use therewith but may be utilized with any reversible polarity sensing devices.

Heretofore, discriminating circuits have comprised complex circuitry for producing the desired two independent output signals. One type of circuit included two channels independent of each other except for their common input and used two transistors of different types to provide initial discrimination at the common input. Each channel required its own power supply which further increased the complexity of the circuit. While it functioned satisfactorily, the large number of electrical parts decreased the dependability of the circuit and in addition since each channel was not alike, difficulties were experienced in producing the same magnitude of output signal from each channel with the same value of input signal to each.

It is an object of the present invention to provide a discriminating circuit of the above disclosed type in which the circuit is simple in construction and composed of relatively few elements.

Another object of the present invention is to provide a discriminating circuit in which the value of the output signal of each polarity is substantially the same for the same magnitude of input signal.

Another object of the present invention is to provide a discriminating circuit which is economical to manufacture and which is rendered more dependable, more trouble free and has a longer life by having only a few number of components.

In attaining the above objects, there is provided two output polarity channels with each channel having identical components. A common power source is used for both channels which provides for amplification of the input signal. Each channel has a transistor and the emitters are connected in series and their bases constitute the input signal terminals. Bypass means in the form of one-way valves are connected paralleling the base-emitter circuit of each transistor and permit a signal of one polarity to flow through one transistor and bypass the other and a signal of the reverse polarity to flow through the other transistor and bypass the first transistor. The one-way valves in the illustrated embodiment are diodes which have very little electrical loss therein so that substantially the total magnitude of the input signal is impressed on the base and emitter of the transistor.

Referring to the drawing, there is shown schematically a discriminating circuit of the instant invention which also provides for amplification of the input signal. The circuit, as shown, has a pair of transistors 10 and 11. These transistors are identical and in the embodiment shown are PNP transistors though, of course, NPN may be used provided the correct polarities of the elements are observed. The base, emitter and collector of each transistor 10 and 11 are indicated by the reference numerals **10*b*, 10*e*, and 10*c* and 11*b*, 11*e* and 11*c* respectively. A pair of input terminals 12 and 13 are connectable to a sensing component (not shown such as a Wheatstone bridge) which has a reversible polarity signal which is indicative of the deviation of an electrical unit from a preselected value and also the magnitude of the deviation. The terminal 12 is connected to the base 10*b* and the terminal 13 is connected to the base 11*b*. The emitters 10*e* and 11*e*** are connected in series.

Connected paralleling the base-emitter circuit of each transistor are bypass means which are one-way valves such as germanium or selenium diodes 14 and 15. The diode 14 is connected as indicated so that with a signal of one polarity, current will be conducted through it while the transistor 10 will not accept this polarity current while a current of the reverse polarity will be blocked by the diode 14 while the transistor 10 will permit passage thereof. Similarly the transistor 11 is paralleled by the diode 15 which has reverse conductive characteristics than the base-emitter circuit of the transistor 11. The collector **10*c* and the emitter 10*e* of the transistor 10 are connected to a source of electrical energy, illustrated as a battery 16. Similarly, the collector and emitter 11*c* and 11*e* respectively of the transistor 11 are connected as shown, to the battery 16**. It is to be understood that the invention is not limited to the sole use of a battery as a source of power but that other sources such as a potential divider, etc. may be utilized in place thereof or in conjunction therewith.

In the present embodiment, it is desired to have the output signal be a voltage or potential difference and accordingly there is connected in series in the collector-emitter circuit of the transistor 10, a resistor 17 across which output terminals 18 are connected. Similarly, there is a resistor 19 in the collector-emitter circuit of the transistor 11 which produces an output at terminals 20.

In the operation of the circuit, and presuming that the input signal has a polarity which makes the terminal 12 positive and the terminal 13 negative, the positive signal is prevented from flowing through the transistor 10 by reason of its reverse blocking characteristics but flows through the diode 14. Current thus approaches the junction of the emitter **11*e* and the diode 15. The diode 15 blocks any current therethrough in this direction while the polarity of the signal is such that it is accepted by the emitter and base of the transistor 11. This produces a gain in current through the collector-emitter circuit of the transistor 11 to produce a potential difference across the resistor 19 and hence a voltage output across the terminals 20**.

Assuming that the signal has a polarity reversed from that above noted, so that the terminal 13 is positive with respect to the terminal 12, current will flow through the diode 15 and the emitter-base circuit of the transistor 10 causing a voltage to appear at the output terminals 18. The signal current is prevented from flowing through the base-emitter of the transistor 11 by its blocking characteristics and prevented by the characteristics of the diode 14 from also flowing therethrough.

Thus in the first instance there will be substantially no voltage appearing in the terminals 18 while it appears at the terminals 20 for one polarity while a signal of the reverse polarity will produce a voltage at the terminals 18 but substantially none at the terminals 20. Of course with an input signal of zero, there will be no voltage at either output terminals. It will be appreciated that transistors have a finite conduction of current from emitter to collector with a zero base-emitter current and also with a signal having a polarity which is blocked by the base-emitter circuit. However this finite current is sufficiently small to be negligible and hence the phrase "substantially no voltage" is used to indicate the voltage at the output when only a finite current is flowing in the collector-emitter circuit of the transistors.

It will be appreciated that there is substantially no loss of the value of the input signal in either diode and that substantially all of the input signal is impressed across the base and emitter of the transistor. In addition the output voltage has a larger magnitude than the input voltage by reason of the amplification characteristics of the transistors 10 and 11.

Though in the illustrated embodiment the output is a voltage, it will be apparent that if a current output is desired that the resistors 17 and 19 would be eliminated and appropriate electrical elements substituted therefor.

There has accordingly been disclosed a discriminating circuit which produces a signal at one output for one polarity of the input signal and produces a signal at another output when the input has a reverse polarity. In addition the circuit provides for amplification of the input signal. The circuit is characterized by only a few components being required and by the necessity of having only a single power supply for both transistors. Moreover, both transistors employed are identical as are the other parts associated with each transistor. This provides for the output value from each transistor being substantially equal for the same magnitude, though of different polarity, of the input signal and eliminates error in fabrication or repairing where electrical components having similar appearance but reverse characteristics are employed.

Variations and modifications may be made within the scope of the claims and portions of the improvements may be used without others.

I claim:

1. A discriminating circuit comprising a pair of similar transistors having their emitters connected in series and normally being of the same state of conduction in their emitter-collector circuit; a pair of input signal terminals, one connected to the base of each transistor; bypass means permitting a signal of one polarity to flow through the emitter-base circuit of one transistor to change its state of conduction and bypass the emitter-base circuit of the other transistor to maintain its same state of conduction and a signal of the reverse polarity to flow through the emitter-base circuit of the other transistor to change its state of conduction and bypass the emitter-base circuit of the first transistor to maintain its same state of conduction; a collector and emitter circuit for each transistor; a source of electrical energy for the collector and emitter circuits; and output means in each collector-emitter circuit.

2. A discriminating-amplifying circuit comprising a pair of similar transistors with their emitters connected in series and normally being of the same state of conduction in their emitter-collector circuit; a pair of signal input terminals, one connected to the base of each transistor; one-way valve means connected across the base and emitter of each transistor such that a signal of one polarity flows through the one-way valve of a first transistor and is accepted by the second transistor to change its state of conduction and a signal of the reverse polarity flows through the one-way valve of the second transistor and is accepted by the first transistor to change its state of conduction; a collector and emitter circuit for each transistor; a source of electrical energy for the collector and emitter circuits; and output means in each collector-emitter circuit.

3. A discriminating-amplifying circuit comprising a pair of similar transistor-diode circuits; each circuit including a transistor and a diode with the diode being connected in parallel to the base and emitter of the transistor such that a signal of one polarity flows through the diode and is blocked by the transistor and a signal of the reverse polarity is accepted by the transistor and blocked by the diode; means connecting the circuits together in series and to a signal input means; a collector-emitter circuit for each transistor; means supplying a source of energy to each collector-emitter circuit; and output means in each collector-emitter circuit.

4. A discriminating circuit comprising a pair of transistors; a pair of input terminals; means connecting the base and emitter of one transistor in series with the base and emitter of the other transistor and in series with the input terminals; a diode connected paralleling the base-emitter circuit of each transistor, each diode being connected to have reverse current flow than its associated transistor; a collector-emitter circuit for each transistor; means for supplying a potential to the collector-emitter circuit of each transistor; and output terminals in each collector-emitter circuit.

5. The invention as defined in claim 4 in which each transistor is of the same type and the potential supplying means is common to both collector-emitter circuits.

References Cited in the file of this patent

UNITED STATES PATENTS

| | | |
|---|---|---|
| 2,594,449 | Kircher | Apr. 29, 1952 |
| 2,595,208 | Bangert | Apr. 29, 1952 |
| 2,665,845 | Trent | Jan. 12, 1954 |
| 2,680,160 | Yaeger | June 1, 1954 |
| 2,726,370 | Linvill et al. | Dec. 6, 1955 |
| 2,831,986 | Sumner | Apr. 22, 1958 |
| 2,843,761 | Carlson | July 15, 1958 |
| 2,891,726 | Decker et al. | June 23, 1959 |

FOREIGN PATENTS

| | | |
|---|---|---|
| 164,560 | Australia | Aug. 11, 1955 |
| 764,154 | Great Britain | Dec. 19, 1956 |
| 1,100,390 | France | Apr. 6, 1955 |